United States Patent
Herrmann et al.

(10) Patent No.: US 12,233,704 B2
(45) Date of Patent: Feb. 25, 2025

(54) COOLING DEVICE FOR AN ELECTRIC DRIVE UNIT OF A MOTOR VEHICLE, DRIVE UNIT AND MOTOR VEHICLE

(71) Applicant: Bayerische Motoren Werke Aktiengesellschaft, Munich (DE)

(72) Inventors: Thomas Herrmann, Illerkirchberg (DE); Thinh Nguyen-Xuan, Erding (DE); Fabian Rattei, Weilheim i.OB (DE); Rene Treffler, Augsburg (DE); Juntao Zhu, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 732 days.

(21) Appl. No.: 17/281,460

(22) PCT Filed: Oct. 7, 2019

(86) PCT No.: PCT/EP2019/077058
§ 371 (c)(1),
(2) Date: Mar. 30, 2021

(87) PCT Pub. No.: WO2020/094314
PCT Pub. Date: May 14, 2020

(65) Prior Publication Data
US 2022/0006353 A1  Jan. 6, 2022

(30) Foreign Application Priority Data
Nov. 6, 2018 (DE) .................... 10 2018 127 665.6

(51) Int. Cl.
*B60K 11/02* (2006.01)
*H02K 5/20* (2006.01)

(52) U.S. Cl.
CPC .............. *B60K 11/02* (2013.01); *H02K 5/203* (2021.01)

(58) Field of Classification Search
CPC . H02K 5/203; H02K 9/19; H02K 1/20; B60K 11/02; B60K 1/00
(Continued)

(56) References Cited

U.S. PATENT DOCUMENTS

2008/0303359 A1   12/2008   Oestreich
2015/0015096 A1   1/2015   Huber
(Continued)

FOREIGN PATENT DOCUMENTS

CN   101317314 A   12/2008
CN   103575140 A   2/2014
(Continued)

OTHER PUBLICATIONS

Machine translation of Tochio et al. JP2012253874 (Year: 2012).*
(Continued)

*Primary Examiner* — Terrance L Kenerly
(74) *Attorney, Agent, or Firm* — Crowell & Moring LLP

(57) ABSTRACT

A cooling device for an electric drive unit of a motor vehicle includes a housing and at least one cooling structure. The housing is configured to receive the at least one component of the drive unit. The housing, at least in some regions thereof, is a cooling jacket for the at least one component and being configured to cool the at least one component. The cooling jacket having at least one cooling duct through which a cooling fluid is flowable. The at least one cooling structure is an insert inserted into the at least one cooling duct and is configured to increase a flow resistance of the cooling fluid by generating turbulences of the cooling fluid.

15 Claims, 6 Drawing Sheets

(58) Field of Classification Search
USPC .......................................................... 310/54
See application file for complete search history.

(56) References Cited

U.S. PATENT DOCUMENTS

| | | | |
|---|---|---|---|
| 2017/0012504 A1* | 1/2017 | Sever ...................... | H02K 15/14 |
| 2017/0271954 A1 | 9/2017 | Hanumalagutti et al. | |
| 2024/0223032 A1* | 7/2024 | Wang ........................ | H02K 9/19 |

FOREIGN PATENT DOCUMENTS

| | | | | |
|---|---|---|---|---|
| DE | 102010041589 A1 * | 3/2012 | ............. | H02K 11/33 |
| DE | 10 2012 205 404 A1 | 10/2013 | | |
| DE | 10 2015 011 279 A1 | 3/2016 | | |
| DE | 10 2016 225 521 A1 | 6/2018 | | |
| JP | 2012-253874 A | 12/2012 | | |
| WO | WO 2014/014407 A2 | 1/2014 | | |
| WO | WO 2014/032876 A2 | 3/2014 | | |

OTHER PUBLICATIONS

Machine translation of Desikan et al. CN103575140 (Year: 2014).*
Chinese-language Office Action issued in Chinese Application No. 2019800554569 dated Sep. 13, 2023 with English translation (15 pages)
International Search Report (PCT/ISA/210) issued in PCT Application No. PCT/EP2019/077058 dated Dec. 6, 2019 with English translation (six (6) pages).
German-language Written Opinion (PCT/ISA/237) issued in PCT Application No. PCT/EP/2019/077058 dated Dec. 6, 2019 (six (6) pages).
German-language Search Report issued in German Application No. 10 2018 127 665.6 dated Feb. 24, 2021 with partial English translation (13 pages).

* cited by examiner

COOLING DEVICE FOR AN ELECTRIC DRIVE UNIT OF A MOTOR VEHICLE, DRIVE UNIT AND MOTOR VEHICLE

BACKGROUND AND SUMMARY OF THE INVENTION

The disclosure relates to a cooling device for an electric drive unit of a motor vehicle that is capable of being driven electrically, for cooling at least one component of the drive unit. The disclosure also relates to a drive unit and a motor vehicle.

In the present case, interest is directed toward motor vehicles that are capable of being driven electrically—for instance, electric vehicles or hybrid vehicles. Such motor vehicles usually exhibit an electric drive system with several interconnected drive units. The drive units are, for instance, an electric machine (e-machine), a high-voltage battery for providing electrical energy for the electric machine, and power electronics—for instance, an inverter which has been connected between the electric machine and the high-voltage battery. For the purpose of cooling these drive units during operation of the drive system, direct and indirect cooling variants are already known from the state of the art. The direct cooling variants in the case of the e-machine include, for instance, the application or spraying of oil droplets onto winding heads of windings of a stator and/or rotor of the e-machine and the associated cooling of the stator or/and rotor. As a rule, however, this cooling variant necessitates a direct coupling or linkage to a gear mechanism of the motor vehicle and requires further components such as an oil pump, for instance.

In the case of the high-voltage battery, the indirect cooling variants include, for instance, a cooling plate mounted on battery cells of the high-voltage battery, which provides for a convective cooling of the battery cells. The cooling variant in the case of power electronics is similar. Indirect cooling is generally based on a jacket structure which surrounds the component of the drive unit to be cooled and which exhibits cooling ducts through which a cooling medium or cooling fluid flows. Heat given off by the component is transported away by convection via these cooling ducts. There are cooling housings for stators of electric machines that include meandering cooling geometries. These meandering cooling geometries are used, as a rule, in one-piece cooling housings which are produced by means of sand-printing processes or die-casting processes. Although such cooling geometries provide for a permanent rerouting of the cooling fluid, guaranteeing a sufficient cooling capacity, they are costly to produce.

It is an object of the present disclosure to provide a cooling variant that is particularly easy to produce for a drive unit of a motor vehicle that is capable of being driven electrically.

In accordance with the disclosure, this and other objects are achieved by a cooling device, a drive unit and also a motor vehicle with the features according to the disclosure.

A cooling device according to the disclosure for an electric drive unit of a motor vehicle that is capable of being driven electrically serves for cooling at least one component of the drive unit. The cooling device exhibits a housing for the at least one component of the drive unit, the housing taking the form of a cooling jacket for the at least one component, for cooling the at least one component at least in some regions, and exhibiting at least one cooling duct through which a cooling fluid is capable of flowing. The cooling device includes, in addition, at least one cooling structure which takes the form of an insert for inserting into the at least one cooling duct and which is designed to increase a flow resistance of the cooling fluid by generating turbulences of the cooling fluid.

The disclosure relates, in addition, to a drive unit for a motor vehicle that is capable of being driven electrically, exhibiting at least one component and a cooling device. The drive unit preferentially takes the form of an electric machine, a high-voltage battery or power electronics. The at least one component is, in particular, a stator of the electric machine, a battery cell of the high-voltage battery or a circuit-breaker of the power electronics.

The cooling device of the drive unit exhibits the housing that surrounds the at least one component of the drive unit at least in some regions in the manner of a jacket and that forms the cooling jacket for the at least one component. However, the housing may, for instance, have been designed not only for cooling but also for holding or fixing the at least one component in a designated position and/or for protection of the at least one component. For instance, the housing can protect the at least one component against environmental influences—for example, moisture or dirt—or against mechanical stress—for example, in the event of impacts on the drive unit that are caused by collision. The housing may be, for instance, a stator housing for the stator of the electric machine, a battery housing for a plurality of interconnected battery cells of the high-voltage battery, or a switch housing for the circuit-breakers of the power electronics.

For the purpose of forming the cooling jacket, the housing exhibits the at least one cooling duct. The cooling duct is designed to route the cooling fluid—for instance, a cooling liquid—along at least one side of the at least one component, and thereby to dissipate heat given off by the at least one component during operation of the drive unit. For the purpose of providing the at least one cooling duct, the housing may, for instance, be of double-walled design, at least in some regions. The cooling fluid can, for instance, be provided by a cooling circuit of the motor vehicle. The housing may exhibit a cooling-fluid port fluidically coupled with the at least one cooling duct, which, for instance, can be coupled with cooling-fluid lines of the cooling circuit. The cooling-fluid port may exhibit a fluid inlet, via which cooling fluid can be introduced into the at least one cooling duct, and a fluid outlet, via which cooling fluid can be drained out of the at least one cooling duct. The fluid inlet and the fluid outlet, which, for instance, take the form of nozzles, may, for instance, be situated opposite one another in the axial direction, which corresponds to a direction of extent of the side of the component to be cooled and also to a direction of flow of the cooling fluid. The cooling duct may, for instance, take the form of a gap and may extend in the axial direction from the fluid inlet to the fluid outlet and consequently provide a substantially laminar flow of the cooling fluid from the fluid inlet to the fluid outlet along the side of the component to be cooled.

A cooling capacity provided by the cooling device depends on, amongst other things, a geometry of the at least one cooling duct, by which a type of flow of the cooling fluid and hence a flow resistance of the cooling fluid are influenced. Whereas meandering cooling ducts—which, however, are costly to manufacture—provide a high cooling capacity by reason of the generated turbulent flow of the cooling fluid, the cooling capacity in the case of simple cooling ducts, which give rise to a substantially laminar flow of the cooling fluid, is lower or even insufficient. Such cooling ducts with simple geometries may, as already described, be gap-shaped and may exhibit large free cross-sections of flow, in which case these cooling ducts route the cooling fluid, in particular, mainly axially along the component and accordingly do not deflect or only barely deflect the cooling fluid.

In order to generate turbulences of the flow of the cooling fluid for the purpose of augmenting the cooling capacity, use is made of the cooling structure taking the form of an insert. By virtue of the configuration of the cooling structure as an insert, it is a separate structural part from the housing. The insert may accordingly be plugged or inserted into the cooling duct and, for instance, may also taken out of the cooling duct again in non-destructive manner. In the state where the insert has been arranged in the cooling duct, the cooling structure permanently deflects the flow of cooling fluid along the direction of flow of the cooling fluid and hence generates turbulences of the cooling fluid. As a result, the flow resistance of the cooling fluid is increased. By virtue of this increased flow resistance, the cooling capacity of the cooling device also increases. Hence the turbulent flow leads, also by reason of a homogenization of the distribution of flow of the cooling fluid, to a better cooling of the at least one component than does a laminar flow of cooling fluid.

By virtue of such an insert, a cooling geometry within the cooling duct can be provided in structurally simple manner, without endowing the cooling duct itself with a cooling geometry—for instance, with meandering convolutions—by manufacturing-engineering methods. Through the use of the insert, which, for instance, can be mass-produced, costs in the course of production and manufacture of the cooling device can be reduced, since the cooling ducts themselves can be produced with a simplified geometry—that is to say, for instance, in the form of a gap—with large free cross-sections of flow.

It proves to be advantageous if in the inserted state in the cooling duct the cooling structure extends along a direction of flow of the cooling fluid over a predetermined length of the cooling duct, in particular over an entire length of the cooling duct, for the purpose of routing the cooling fluid along the cooling structure. In the direction of flow, which is oriented along the axial direction of the component, the cooling structure accordingly exhibits a length that, in particular, corresponds to a length of the cooling duct. The cooling structure accordingly extends parallel to two opposing walls of the cooling duct extending along the direction of flow. As a result, the cooling fluid flows along the cooling structure through the at least one cooling duct which in the process generates the turbulences of the cooling fluid.

Over and above this, there may be provision that a cross-sectional shape and/or cross-sectional size of the insert corresponds to a cross-section of flow provided by the cooling duct. Dimensions of the insert at right angles to the direction of flow of the cooling fluid accordingly correspond to dimensions of the at least one cooling duct at right angles to the direction of flow. For instance, a width and/or thickness of the insert corresponds to a diameter of the at least one cooling duct. The insert accordingly bears against the walls of the cooling duct extending along the direction of flow and has been adapted to a cross-section of the at least one cooling duct. By this means, the insert extends completely over a cross-section of flow of the cooling fluid in the cooling duct. Consequently, in advantageous manner there is no free cross-section of flow between the insert and the walls of the cooling duct, through which the cooling fluid might flow unhindered.

Particularly preferably, the cooling structure takes the form of a fibrous woven fabric exhibiting a structure consisting of crossed fibers. The insert has accordingly been formed in fiber-structured manner. By the term "fibrous woven fabric" or "fibrous braided fabric" or "fibrous knitted fabric", here a formed object exhibiting meshes and produced by entanglements of fibers is to be understood. For instance, the fibrous woven fabric may be produced in two layers, from at least two fiber systems. These fiber systems are crossed, so that the meshes arise. If the fibers within a fiber system have been arranged, for instance, extending parallel to one another and the fiber systems are crossed at right angles, rectangular meshes arise. But the fibers may also be entangled to form any other braided fabric, for instance a hexagonal braided fabric.

The woven-fabric-like insert is inserted into the cooling duct in such a manner that the woven-fabric structure extends along the direction of flow. Accordingly, the flow does not take the shortest, direct path from the fluid inlet in the direction of the fluid outlet but is deflected on its path along the woven-fabric structure. As a result, the flow is distributed more uniformly over the cooling jacket. Over and above this, the fibrous woven fabric even provides for a better cooling of the drive unit than, for instance, a cooling duct with a meandering structure of the cooling duct. Via the structure of the fibrous woven fabric—such as, for instance, via the fiber diameter, a number of layers, a width or size of the meshes, etc.—the desired flow resistance can be easily adjusted, in order to achieve an optimal cooling action.

The fibers can be produced from any material. In particular, the fibers of the insert consist of metal, ceramic and/or plastic. A metallic fiber (wire) is particularly advantageous, since it can be twisted or interlaced particularly easily and inexpensively to form a wire fabric or wire mesh. In advantageous manner such a fibrous woven fabric can be manufactured particularly inexpensively and in large numbers.

In a further development, the housing is of multi-part design and exhibits at least one inner housing part facing toward the component and at least one outer housing part arranged at a distance from the inner housing part, forming a gap. The at least one cooling structure is capable of being inserted into the gap which forms the at least one cooling duct. By virtue of the multi-part—for instance, two-part—design of the housing, the cooling duct can be manufactured particularly easily. Accordingly, no elaborate geometries have to be produced in walls of the housing, for instance by milling, sand-printing processes or die-casting processes. Rather, it is sufficient to arrange the housing parts—accordingly, the inner housing part and the outer housing part—at a distance from one another, forming the gap or interspace. The housing parts may be simple metal sheets or plastic parts which, for instance, merely have to be adapted to a shape of the component. Since such a gap-type cooling, in which the cooling fluid flows axially through the gap, gives rise to the laminar flow and therefore provides a slight cooling capacity, the cooling structure is inserted or introduced into the gap. This cooling structure generates the turbulences in the flowing cooling fluid and consequently provides for an increased flow resistance, augmenting the cooling capacity. A cross-sectional shape of the insert has been adapted to a cross-sectional shape of the gap. For instance, the insert and the gap may exhibit an annular, rectangular or any other cross-section.

In one embodiment, the cooling device is designed for cooling a stator of an electric machine, the inner housing part and the outer housing part each taking the form, for the purpose of being arranged on a hollow cylindrical sheet packet of the stator, of hollow cylindrical jacket-wall elements and having been arranged substantially concentrically relative to one another, forming a gap, providing an annular cross-section of flow, between the inner housing part and the outer housing part. In particular, the cooling structure takes the form of a hollow cylindrical insert for inserting into the gap. The drive unit is consequently an electric machine which includes the cooling device for cooling the component taking the form of a stator. The stator includes the hollow cylindrical sheet packet with an inside facing toward a cavity and with an outside situated radially opposite the inside. Winding grooves which extend axially along a height of the sheet packet and in which stator windings have been arranged may have been formed in the inside of the sheet packet.

The inner housing part may be arranged on the outside of the sheet packet and may consequently surround the sheet packet in a peripheral direction of the sheet packet in the manner of a jacket. The outer housing part surrounds the inner housing part, forming a hollow cylindrical gap. The housing accordingly takes the form of a hollow, double-walled cylinder jacket. The direction of flow extends in the axial direction along the outside of the sheet packet from a first end face of the housing parts to a second end face of the housing parts. For instance, the fluid inlet may have been arranged on the first end face, and the fluid outlet may have been arranged on the second end face. The cooling structure is now inserted into the hollow cylindrical gap by which the annular cross-section of flow for the cooling fluid is provided. The cooling structure is likewise in the form of a hollow cylinder and consequently exhibits a cross-section corresponding to the cross-section of flow. For instance, the cooling structure can be plugged or introduced axially into the gap between the inner housing part and the outer housing part. The sheet packet, the inner housing part, the cooling structure and the outer housing part have accordingly been arranged concentrically relative to one another. A height of the hollow cylindrical insert in the axial direction corresponds, in particular, to a height of the housing parts. A radial thickness of the hollow cylindrical insert in the radial direction corresponds to a spacing between the inner housing part and the outer housing part, and hence to a gap diameter.

In another embodiment, the cooling device is designed for cooling at least one battery cell of a high-voltage battery, the housing being designed in the form of a box for the purpose of receiving the at least one battery cell of the high-voltage battery. The inner housing part and the outer housing part take the form of plate-shaped housing-wall elements, arranged plane-parallel to one another, of at least one wall of the housing, and the at least one cooling duct has been formed as a gap, providing a rectangular cross-section of flow, between the inner housing part and the outer housing part. In particular, the cooling structure takes the form of a plate-shaped insert for inserting into the gap. The drive unit is accordingly the high-voltage battery with a plurality of components in the form of battery cells. The housing may be cuboid, for instance, in which case the housing walls enclose a receiving space for receiving the battery cells. At least one of the walls of the housing—for instance, a housing bottom—is of double-walled design and exhibits an interior housing-wall element—that is to say, the inner housing part—and an exterior housing-wall element—that is to say, the outer housing part. The gap—which, for instance, is cuboid and as a result provides the rectangular cross-section of flow—is constituted by the housing-wall elements arranged in parallel. In the gap the cooling fluid is routed along one side of the battery cells which, for instance, may have been stacked and interconnected to form several battery modules. The flat, plate-like insert, which likewise exhibits a rectangular cross-section, can be inserted into this gap. The housing-wall elements and the insert have accordingly been arranged plane-parallel to one another. The insert may, for instance, take the form of a rectangular wire fabric.

The disclosure encompasses, in addition, a motor vehicle exhibiting at least one drive unit. The motor vehicle takes the form, in particular, of an electric vehicle or hybrid vehicle and may, for instance, exhibit several differently designed drive units in the form of an electric machine, a high-voltage battery and power electronics.

The embodiments presented with reference to the cooling device and the advantages thereof apply correspondingly to the inventive drive unit and to the inventive motor vehicle.

The features and combinations of features mentioned above in the description, and also the features and combinations of features mentioned below in the description of the figures and/or shown solely in the figures, can be used not only in the respectively specified combination but also in other combinations or on their own.

Other objects, advantages, and novel features of the various embodiments of the disclosure are derived from the embodiments that are described hereunder in conjunction with the following drawings, in which:

DETAILED DESCRIPTION OF THE DRAWINGS

In the figures, identical and functionally identical elements have been provided with the same reference symbols.

Figure 1:
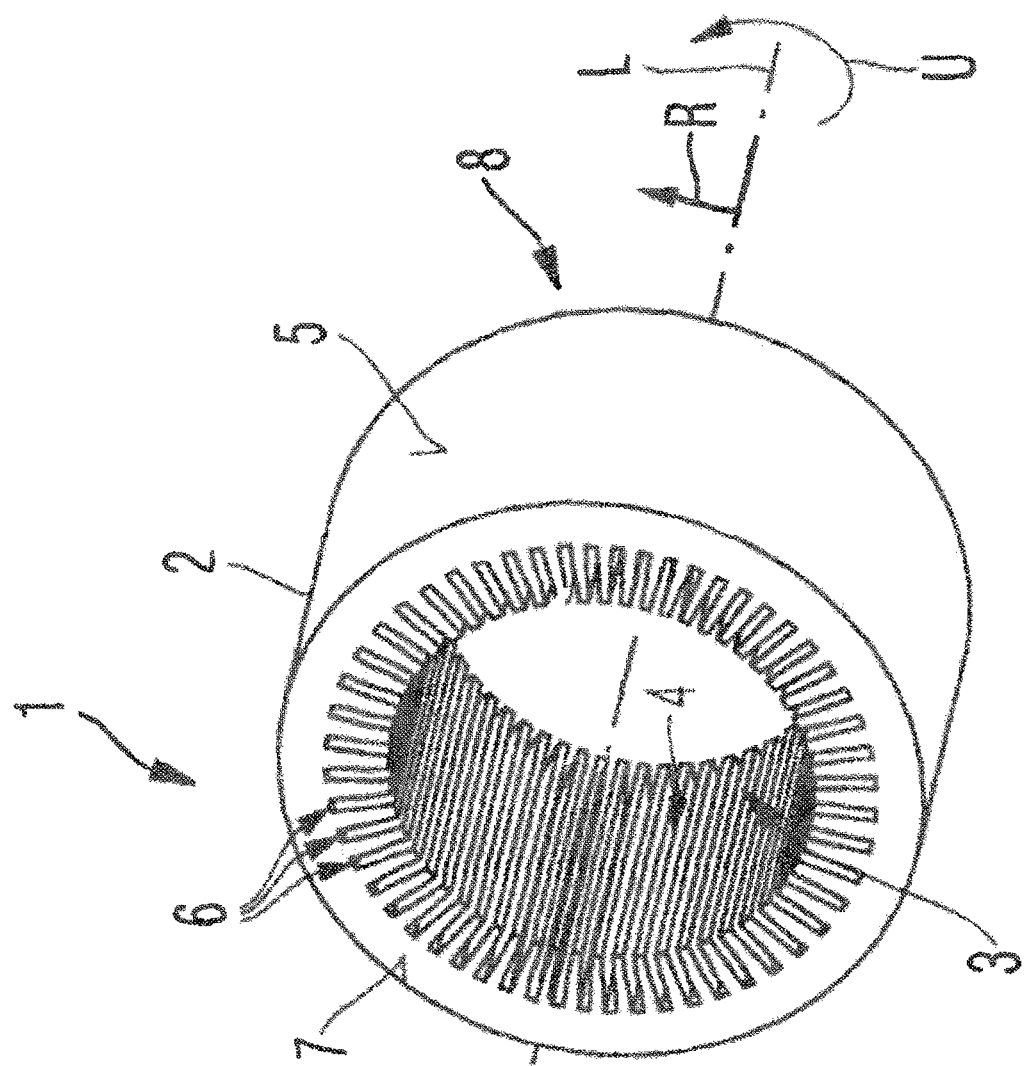
FIG. 1 is a schematic representation of a component of a drive unit of a motor vehicle.

FIG. 1 shows a component 1 of a drive unit for a motor vehicle that is capable of being driven electrically. The component 1 here is a stator of a drive unit in the form of an electric machine, of which merely a sheet packet 2 of the stator is shown here. But the drive unit may also be a high-voltage battery with a plurality of battery cells, or power electronics with circuit-breakers. The sheet packet 2 is designed to revolve around a longitudinal axis L of the stator 1 along a peripheral direction U and takes the form of a hollow cylinder. The longitudinal axis L also corresponds to an axis of rotation about which a rotor, not shown here, of the electric machine, which is rotatably mounted in a cylindrical cavity 3 of the sheet packet 2, rotates. The sheet packet 2 exhibits an inside 4 which encloses the cavity 3. In addition, the sheet packet 2 exhibits an outside 5 situated opposite the inside 4 in the radial direction R. A plurality of winding grooves 6 have been distributed in the peripheral direction U in the inside 4 of the sheet packet 2. The winding grooves 6 extend axially along the longitudinal axis L from a first end face 7 of the sheet packet 2 to a second end face 8 of the sheet packet 2 situated axially opposite the first end face 7. Stator windings, not shown here, of the stator 1 are arranged in these winding grooves 6.

Figure 2:
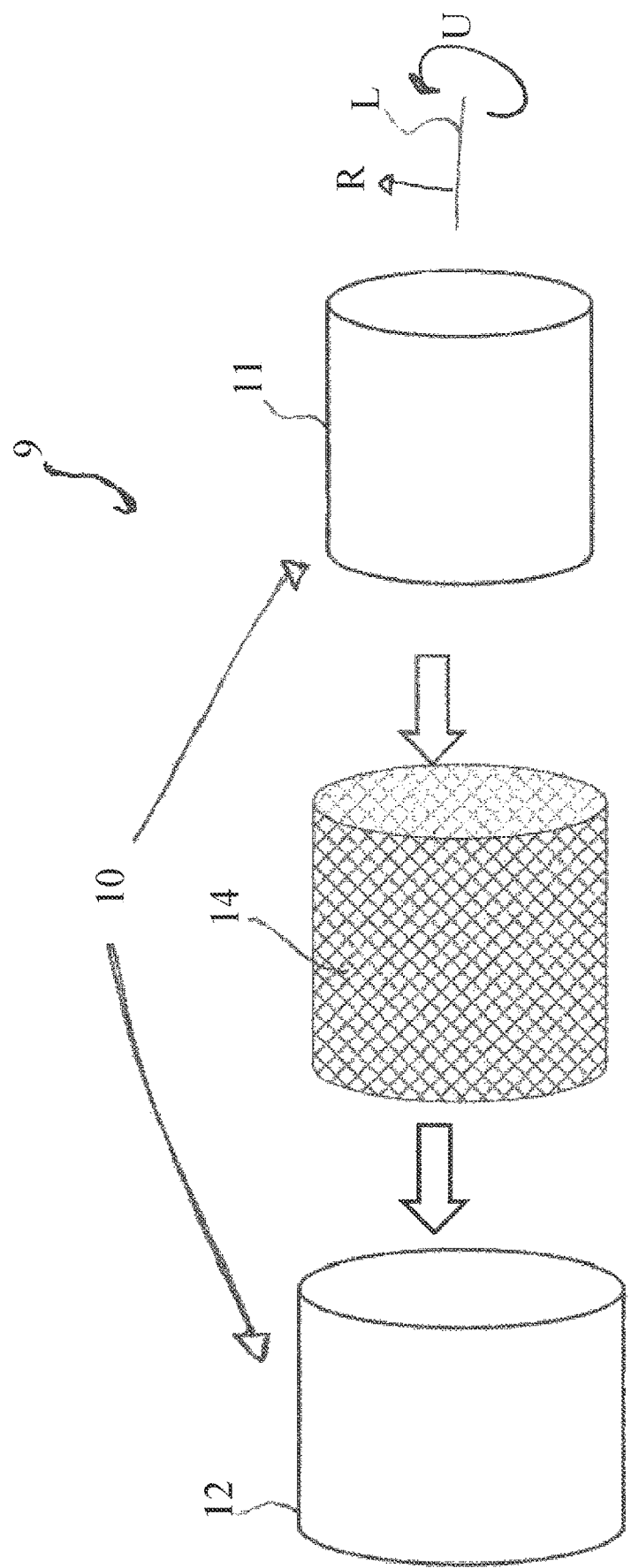
FIG. 2 is a schematic exploded representation of the drive unit.
Figure 3:
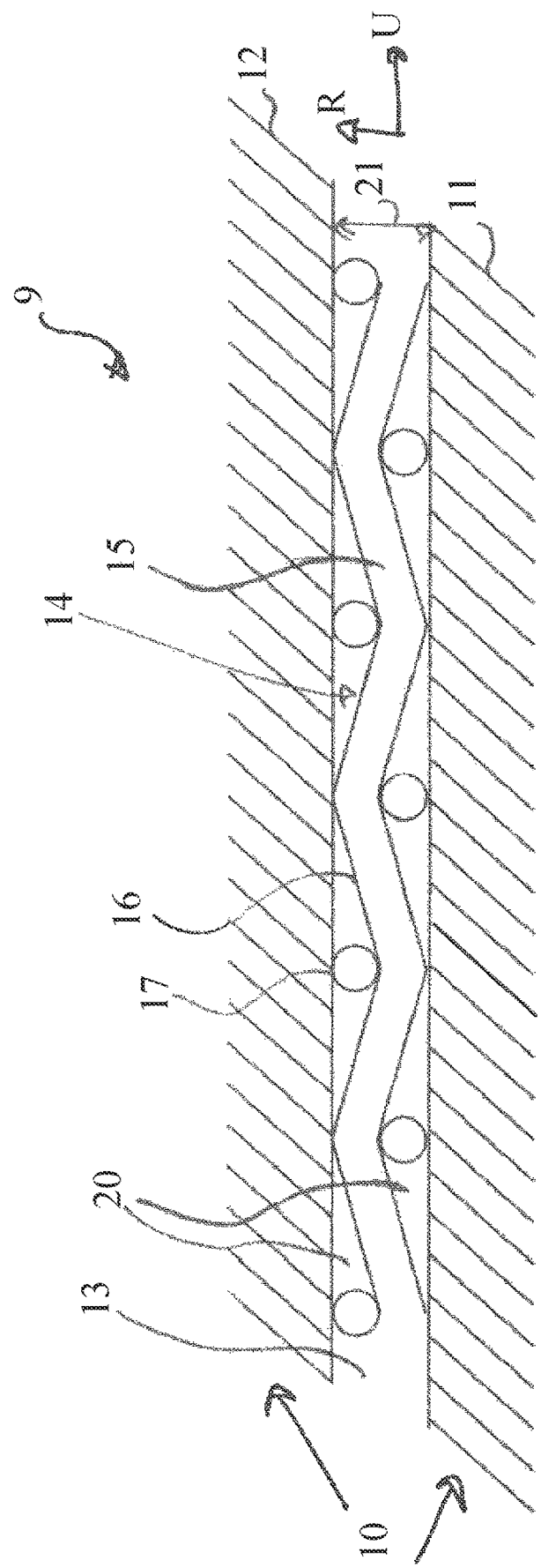
FIG. 3 is a cross-sectional representation through the assembled cooling device according to FIG. 2.

In order to be able to cool the stator 1, the drive unit exhibits a cooling device 9 which is shown in an exploded representation in FIG. 2 and in a cross-sectional representation in the assembled state in FIG. 3. The cooling device 9 exhibits a housing 10 which here is of bipartite design and which is arranged on the sheet packet 2. The housing 10 exhibits an inner housing part 11 and an outer housing part 12 which each take the form of hollow cylindrical jacket-wall elements. The inner housing part 11 is arranged, for instance in abutting manner, on the outside 5 of the sheet packet 2 and encloses the sheet packet 2 in the manner of a jacket. The outer housing part 12 is arranged concentrically relative to the inner housing part 11, forming a gap 13 (see FIG. 3) between the inner housing part 11 and the outer housing part 12. An inside diameter of the outer housing part 12 is accordingly larger than an outside diameter of the inner housing part 11. The gap 13 here takes the form of a hollow cylinder and forms a cooling duct with an annular cross-section of flow, through which cooling fluid for cooling the stator 1 is able to flow along a direction of flow. The direction of flow here is oriented along the longitudinal axis, and the cross-section of flow lies in the R-U plane. The housing 10 accordingly forms a cooling jacket for the component 1, here the stator of the electric machine.

In order to supply the cooling fluid to the gap 13 and to withdraw it, the housing 10 exhibits a cooling-fluid port, not shown here, which comprises a fluid inlet and a fluid outlet. The fluid inlet and the fluid outlet may have been arranged at axially opposing ends of the housing 10, so that, in the state where the housing 10 has been arranged on the sheet packet 2, the fluid inlet has been arranged, for instance, in the region of the first end face 7 of the sheet packet 2 and the fluid outlet has been arranged in the region of the second end face of the sheet packet 2. The axial gap 13, which has no winding along the direction of flow, exhibits along the direction of flow a low flow resistance in respect of the cooling fluid, as a result of which the cooling fluid flows through the gap 13 in laminar manner along the outside 5 of the sheet packet 2. This laminar flow results in an insufficient cooling capacity for the component 1.

Figure 4:
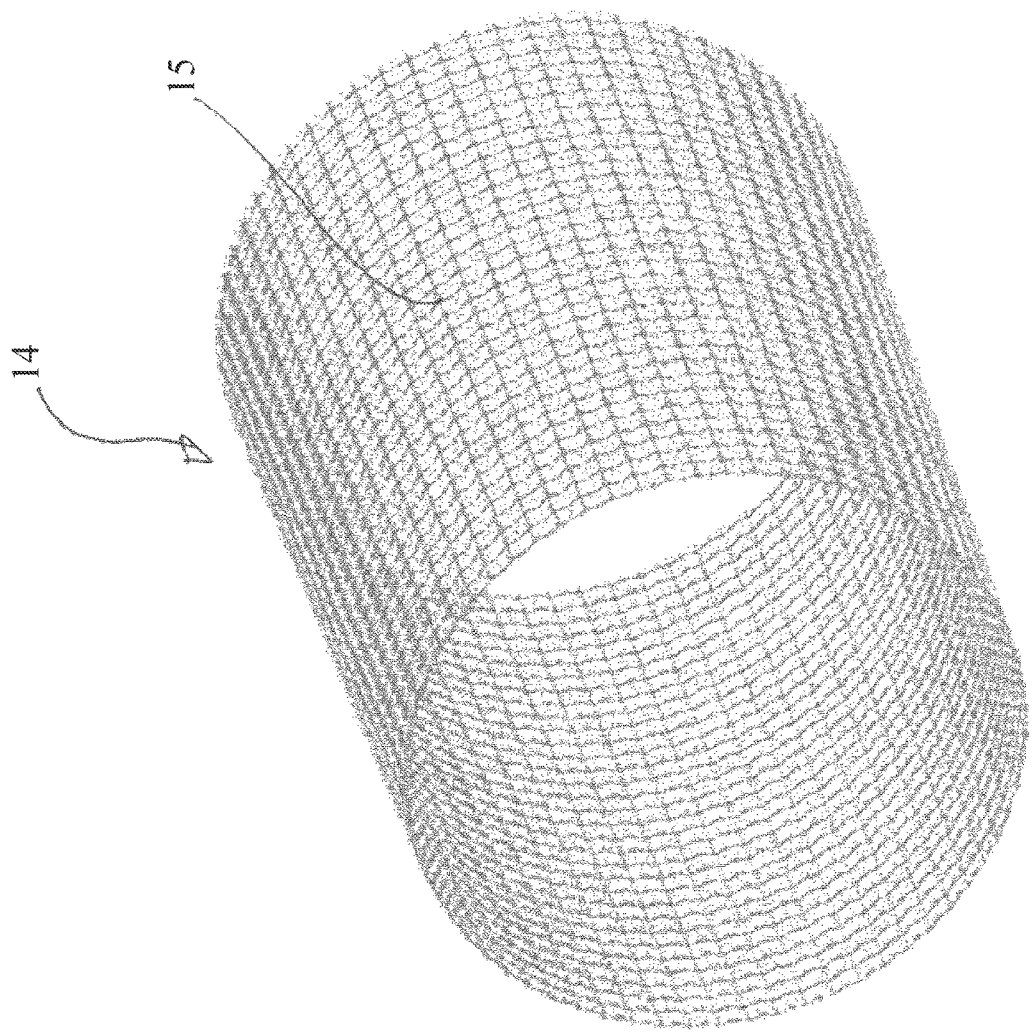
FIG. 4 is a schematic perspective representation of a cooling structure of the cooling device.
Figure 5:
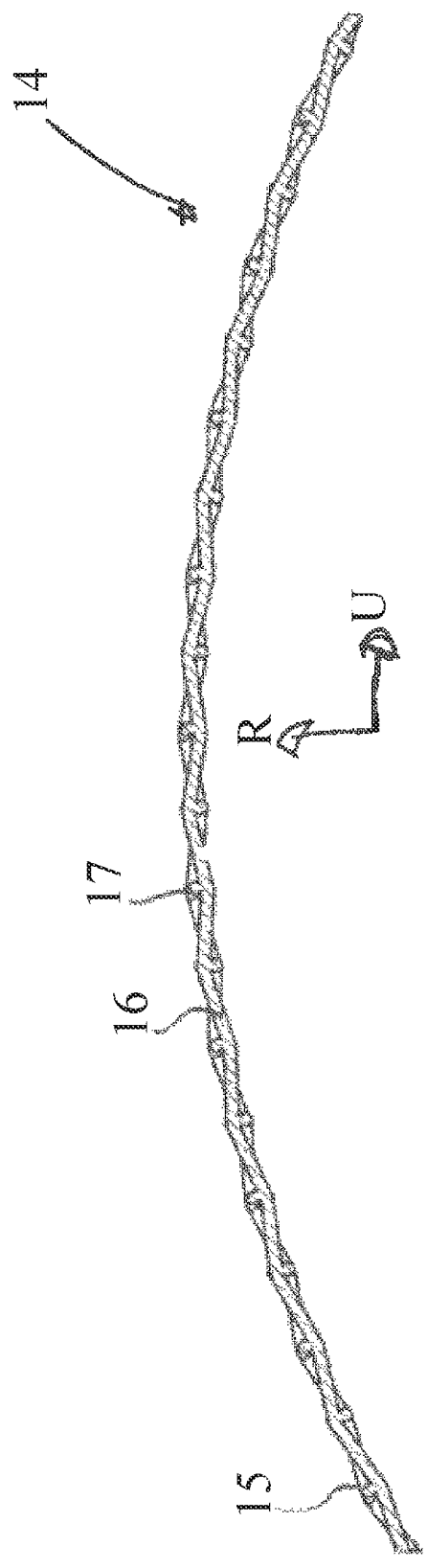
FIG. 5 is a cross-sectional representation through the cooling structure according to FIG. 4.
Figure 6:
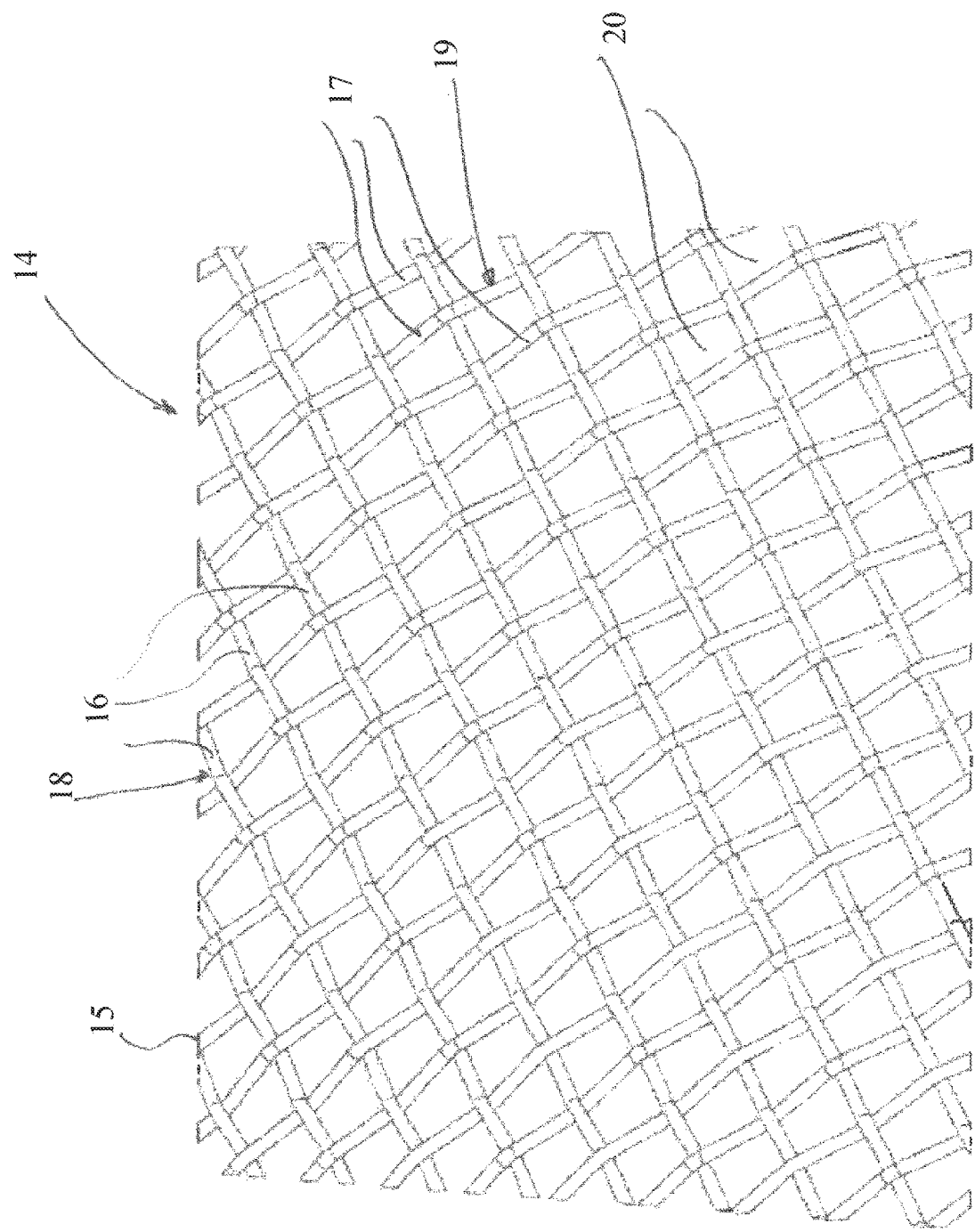
FIG. 6 is an enlarged representation of a fibrous braided fabric of the cooling structure according to FIG. 4.

In order to generate a turbulent flow while the cooling fluid is flowing through the gap 13, the cooling device 9 exhibits a cooling structure 14. The cooling structure 14 is shown in a perspective representation in FIG. 4, in a cross-sectional representation in the R-U plane in FIG. 5, and in an enlarged representation in FIG. 6. The cooling structure 14 exhibits, in particular, a cross-section that corresponds to the cross-section of flow. Therefore the cooling structure 14 here takes the form of a hollow cylindrical insert which can be arranged in the gap 13. For instance, the inner housing part 11, the cooling structure 14 and the outer housing part 12 can be plugged together, so that they have been arranged concentrically relative to one another around the longitudinal axis L.

The cooling structure 14 here exhibits a woven fabric 15 or knitted fabric or braided fabric consisting of fibers 16, 17. The fibers 16, 17 may be, for instance, metal wires, ceramic fibers, plastic fibers or such like. Accordingly, the woven fabric 15 can be manufactured inexpensively and in large numbers. Here the woven fabric 15 has been formed in two layers. Fibers 16 constitute a first fiber system 18, and fibers 17 constitute a second fiber system 19. Fibers 16 here have been arranged extending parallel to one another in the first fiber system 18, and fibers 17 have been arranged extending parallel to one another in the second fiber system 19. The fiber systems 18, 19 here have been crossed at right angles and, as a result, form rectangular meshes 20. But the fibers 16, 17 may also have been arranged not extending in parallel within the respective fiber system 18, 19, so that the meshes 20 exhibit an arbitrary different shape, for instance trapezoidal or hexagonal. In the state where the cooling structure 14 has been arranged in the gap 13, a mesh plane lies in the U-L plane, so that the cooling fluid flows along the mesh plane and hence along the cooling structure 14. In addition, a thickness of the cooling structure 14 corresponds to a radial width 21 of the gap 13, so that the cooling structure 14 fills out the entire cross-section of flow. Consequently there is no "free" cross-section of flow in the cooling duct, through which the cooling fluid might flow in laminar manner.

LIST OF REFERENCE SYMBOLS 1 component
2 sheet packet
3 cavity
4 inside
5 outside
6 winding groove
7 first end face
8 second end face
9 cooling device
10 housing
11 inner housing part
12 outer housing part
13 gap
14 cooling structure
15 woven fabric
16 fibers
17 fibers
18 fiber system
19 fiber system
20 mesh
21 width
L longitudinal axis
R radial direction
U peripheral direction.

What is claimed is:
1. A cooling device for an electric drive unit of a motor vehicle that is electrically driveable, the electric drive unit being configured to drive at least one component of the drive unit, comprising:
a housing configured to receive the at least one component of the drive unit, the housing, at least in some regions thereof, being a cooling jacket for the at least one component and being configured to cool the at least one component, the cooling jacket having at least one cooling duct through which a cooling fluid is flowable; and
at least one cooling structure that is an insert inserted into the at least one cooling duct and which is configured to increase a flow resistance of the cooling fluid by generating turbulences of the cooling fluid, wherein the at least one cooling structure includes a first fiber system and a second fiber system that are independent of one another, first fibers in the first fiber system run parallel to one another and second fibers in the a second fiber system run parallel to one another, the first fiber system and the second fiber system being arranged at an angle relative to one another.

2. The cooling device according to claim 1, wherein
in the inserted state in the cooling duct the cooling structure extends along a direction of flow of the cooling fluid over a predetermined length of the cooling duct, the predetermined length being an entire length of the cooling duct, so as to thereby route the cooling fluid along the cooling structure.

3. The cooling device according to claim 2, wherein
a cross-sectional shape and/or cross-sectional size of the cooling structure corresponds to a cross-section of flow of the cooling fluid provided by the cooling duct.

4. The cooling device according to claim 3, wherein
the cooling structure is a fibrous woven fabric having a structure consisting of crossed fibers.

5. The cooling device according to claim 4, wherein
the fibers of the insert consist of metal, ceramic and/or plastic.

6. The cooling device according to claim 5, wherein the housing has a multi-part design and includes at least one inner housing part facing toward the component and at least one outer housing part arranged at a distance from the inner housing part, forming a gap, the at least one cooling structure being insertable into the gap which forms the at least one cooling duct.

7. The cooling device according to claim 6, wherein
the cooling device is configured to cool a stator of an electric machine, the inner housing part and the outer housing part each being arranged on a hollow cylindrical sheet packet of the stator, and having hollow cylindrical jacket-wall elements arranged substantially concentrically relative to one another, forming a gap, providing an annular cross-section of flow, between the inner housing part and the outer housing part.

8. The cooling device according to claim 7, wherein
the cooling structure is a hollow cylindrical insert insertable into the gap.

9. The cooling device according to claim 8, wherein
the cooling device is configured to cool at least one battery cell of a high-voltage battery, the housing being box-shaped to thereby receive the at least one battery cell of the high-voltage battery, the inner housing part and the outer housing part being plate-shaped housing-wall elements of the housing arranged plane-parallel to one another, and the at least one cooling duct being formed as a gap, providing a rectangular cross-section of flow, between the inner housing part and the outer housing part.

10. The cooling device according to claim 9, wherein
the cooling structure is a plate-shaped insert insertable into the gap.

11. A drive unit for a motor vehicle that is electrically driveable, having at least one component and the cooling device according to claim 10.

12. The drive unit according to claim 11, wherein
the at least one drive unit is an electric machine and/or a high-voltage battery and/or an inverter.

13. A motor vehicle with at least one drive unit according to claim 12.

14. The cooling device according to claim 2, wherein the at least one component of the drive unit is at least one of a stator, a high voltage battery, and/or power electronics.

15. The cooling device according to claim 1, wherein the housing has a multi-part design and includes at least one inner housing part facing toward the component and at least one outer housing part arranged at a distance from the inner housing part, forming a gap, and
the at least one cooling structure is insertable into the gap, such that a first side of the of the at least one cooling structure is immediately adjacent to the outer housing part, and a second side of the at least one cooling structure is immediately adjacent to the inner housing part.

* * * * *